(12) United States Patent
Yee et al.

(10) Patent No.: US 11,687,756 B2
(45) Date of Patent: Jun. 27, 2023

(54) METHODS, MEDIUMS, AND SYSTEMS FOR APPLYING A DISPLAY TO A TRANSACTION CARD

(71) Applicant: Capital One Services, LLC, McLean, VA (US)

(72) Inventors: Bryant Yee, Washington, DC (US); Tyler Maiman, Melville, NY (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/826,421

(22) Filed: May 27, 2022

(65) Prior Publication Data

US 2022/0358338 A1    Nov. 10, 2022

Related U.S. Application Data

(63) Continuation of application No. 17/307,281, filed on May 4, 2021, now Pat. No. 11,354,555.

(51) Int. Cl.
*G06K 19/077* (2006.01)
*G06Q 20/34* (2012.01)
*G06K 19/07* (2006.01)

(52) U.S. Cl.
CPC ... *G06K 19/07707* (2013.01); *G06K 19/0709* (2013.01); *G06Q 20/341* (2013.01)

(58) Field of Classification Search
None
See application file for complete search history.

(56) References Cited

U.S. PATENT DOCUMENTS

| 11,354,555 | B1* | 6/2022 | Yee | G06K 19/07707 |
|---|---|---|---|---|
| 2017/0132613 | A1 | 5/2017 | Tunnell et al. | |
| 2019/0251411 | A1* | 8/2019 | Gire | G06K 5/00 |
| 2021/0012323 | A1 | 1/2021 | Rule et al. | |

OTHER PUBLICATIONS

International Search Report and Written Opinion for the International Patent Application No. PCT/US2022/020879, dated Jun. 29, 2022, 13 pages.

* cited by examiner

*Primary Examiner* — Kristy A Haupt
(74) *Attorney, Agent, or Firm* — KDW Firm PLLC

(57) ABSTRACT

Exemplary embodiments relate to updatable displays for transaction cards, such as credit cards or event passes. The displays may be, for instance, an electrophoretic or memory liquid crystal diode display. The transaction card may include a contact pad capable of engaging in wireless communication. Information may be exchanged between the transaction card and a mobile device or terminal, where a processor on the mobile device processes the received information to generate displayable information. The processor updates the display with the displayable information. The contact pad may be electrically connected to the display, and the display may derive electrical power to perform the updating from the wireless communication. For example, where the wireless communication is a near field communication (NFC), a radio frequency field may be generated that supplies enough power to run the processor and at least partially update the display.

20 Claims, 15 Drawing Sheets

METHODS, MEDIUMS, AND SYSTEMS FOR APPLYING A DISPLAY TO A TRANSACTION CARD

RELATED APPLICATIONS

This application is a continuation of U.S. patent application Ser. No. 17/307,281, filed May 4, 2021, titled "METHODS, MEDIUMS, AND SYSTEMS FOR APPLYING A DISPLAY TO A TRANSACTION CARD". The contents of the aforementioned application is incorporated herein by reference in its entirety.

BACKGROUND

Transaction cards, such as debit and credit cards, tend to be relatively static entities. Such a card is generally made of plastic or metal and has account information for a customer embossed or printed on its surface. This can be a problem if the card's number is compromised, which may necessitate that a new card be created and issued in order to update the card's number (even if the authorized user retains the original card). Moreover, cards are typically sent through the mail, which provides opportunities for thieves to steal and use the card or card number before it arrives at the intended user. Still further, each card needs to be customized to its user (with custom account information marked on each card), increasing the amount of time and cost required to issue a card to a customer.

BRIEF SUMMARY

Exemplary embodiments relate to methods, mediums, and systems for applying a display to a transaction card. As noted above, static cards have a number of problems that could be alleviated by providing an updateable display on the card. Unfortunately, displays generally require some sort of power, which is not typically available on a transaction card.

Embodiments described herein couple particular types of low-power displays with contact pads configured to wirelessly communicate with a mobile device or payment terminal. The contact pad may use a small amount of the energy from the wireless communication to update the display.

For example, according to a first embodiment, a wireless communication containing information may be received via a contact pad on a transaction card. The information may be processed using a processor on the transaction card to generate displayable information, and a display on the transaction card may be updated with the displayable information. The display may be electrically connected to the contact pad and may derive electrical power for the updating at least in part from the wireless communication. In some cases, the electrical power from the communication may be insufficient, by itself, to fully update the display. In these cases, the display may be partially updated, or the power may be supplemented using a capacitor or other energy storage device on the transaction card.

Because the display is powered through the contact pad using the energy from the wireless communication, the display can be provided with a reliable way to receive sufficient power to allow the display to be updated. Because contact pads provided on transaction cards may receive power passively in order to perform other functions (e.g., authorizing a transaction), this power source can serve multiple purposes on a card and may not require a substantial redesign of existing chip-based transaction cards.

According to a second embodiment, the display may be an electrophoretic display and/or a memory liquid crystal display ("memory LCD"). Electrophoretic displays are particularly well-suited to applications on transaction cards, because they generally do not require constant power in order to maintain information on the display: they can be updated initially with a small amount of power, and then will maintain the updated state. Such displays can be easily updated (at least in part) using the power derived from a wireless communication. Memory LCD displays may require some small amount of sustained power in order to continue operating, but are also low-power displays that can be powered through a wireless communication to display information on at least a transient basis. Even if the information can only be displayed temporarily, this capability may be helpful for displaying information like an account balance (which a user might not wish to maintain on the face of their card on a long-term basis).

According to a third embodiment, the information received in the wireless communication may include a request to initially authorize a transaction card for use with a specified transaction account. The displayable information may include an identifying number for the specified transaction account. With this embodiment, a generic card with a blank but updatable display can be sent to a user. The user can then authorize the card using (e.g.) a mobile device, which can cause the user's account information to be stored on the contact pad in the card and can cause the display to reflect their account information (e.g., the card number, expiration date, account holder name, etc.). This reduces the risks of initially sending a card to a user, since the card is not usable and does not display any personal information until the user specifically authorizes the card for use.

According to a fourth embodiment, the information received in the wireless communication may include a request to provision a new temporary identification number for a transaction account associated with the transaction card. The displayable information may include the new temporary identification number. The temporary identification number may be generated by a processor of the contact pad, for example in response to a transaction being completed. The old identification number may be simultaneously retired (except, perhaps, for repeating transactions). In this way, the card can cycle through new identification numbers on a regular basis, reducing the opportunities for fraud. On a conventional card, this procedure would be complicated by the fact that the identification number is typically printed or embossed on the card face; however, with the updateable display described herein this limitation can be overcome.

According to a fifth embodiment, the displayable information may include account information for a transaction account associated with the transaction card and/or access credentials for an event. For instance, in the case of a credit or debit card, the display may show the current account balance, fraud alerts, or other account information. For an event such as a concert or sporting event, the display can be updated to show an access code that, when scanned, provides access to the event. This may be particularly useful to provide reusable event ticket cards, which might be issued by an event sponsor that offers a series of events, sports teams, etc.

According to a sixth embodiment, the wireless communication may be a near field communication ("NFC") received from a mobile device and/or a payment terminal. Since many mobile devices and payment terminals are already provided with NFC capabilities, this provides a convenient way to both transmit information to the contact pad on the card, and to provide a source of power (via the NFC radio frequency energy) for the display. Moreover, the user can use the mobile device to perform tasks like initially authorizing their card, which is the time at which it would be helpful to initially write personal information to the card display. Moreover, because the card will often be used in connection with payment terminals, this provides a frequently-encountered avenue for powering the display. Because the card receives an NFC message from the payment terminal when a transaction occurs, and because this is precisely the time when certain types of updates would be helpful (such as provisioning a new temporary card number or displaying an account balance), an NFC communication from a mobile terminal is particularly well-suited to display updates.

According to a seventh embodiment, the display may be configured to automatically fade out over a predetermined period of time. For example, when used in connection with a memory LCD display, there may not be sufficient power to hold information on the display for a long period of time. This can, however, be advantageous for certain types of information that a user might not wish to display on the card on a semi-permanent basis. For example, a transient display may be useful for presenting an account balance after a transaction has occurred, or a temporary personal identification number ("PIN") that may be used to verify a transaction.

These and other embodiments will be described with reference to the following Figures.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

BRIEF DESCRIPTION OF THE SEVERAL VIEWS OF THE DRAWINGS

Figure 1:
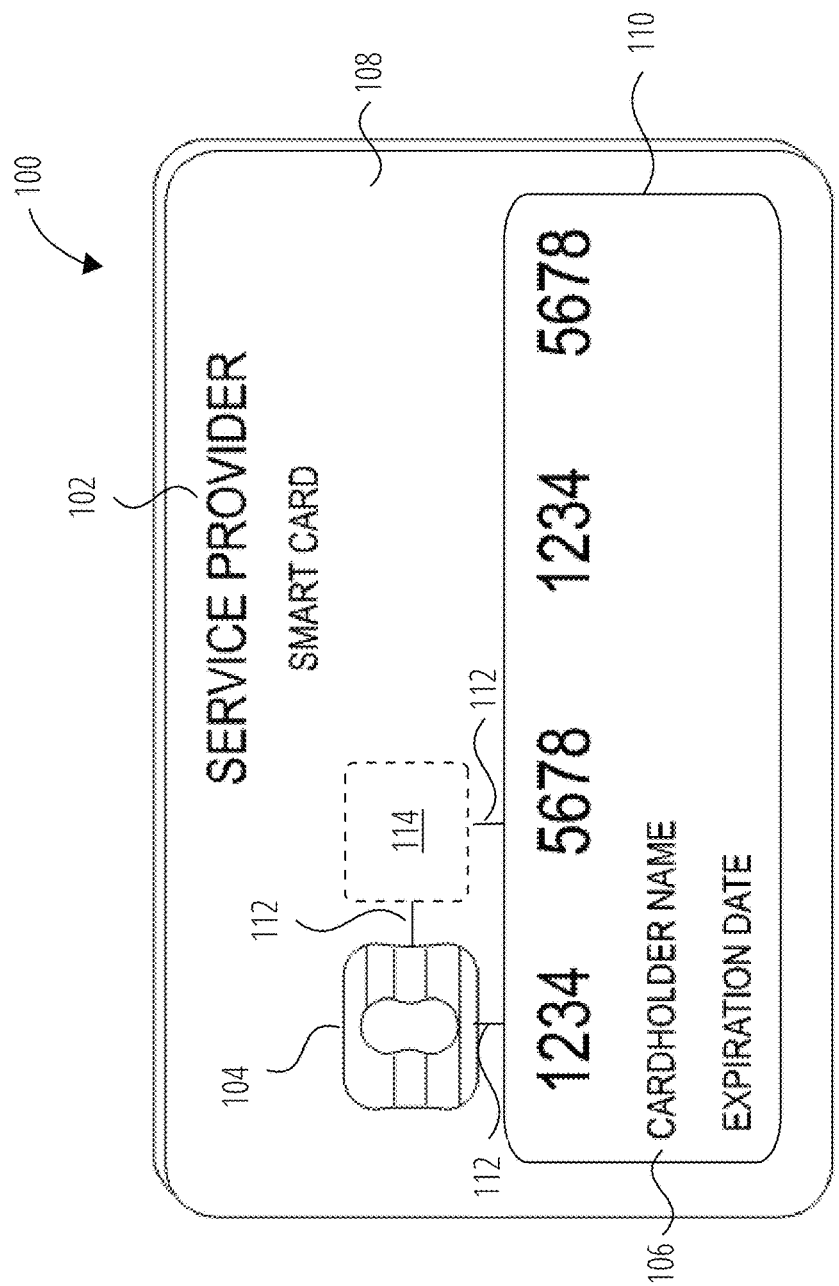

FIG. 1 illustrates a transaction card 100 in accordance with one embodiment.

Figure 2:
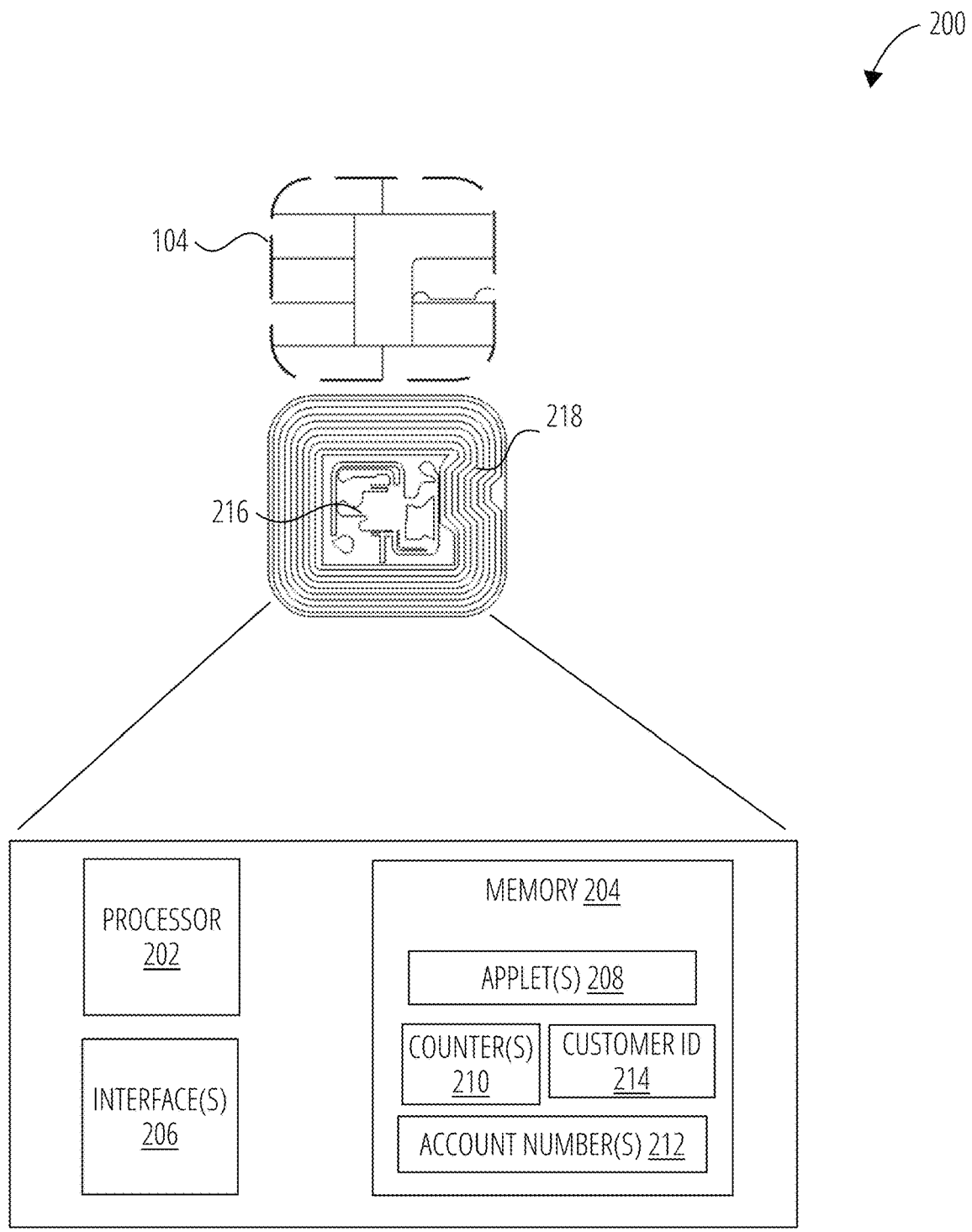

FIG. 2 illustrates a transaction card component 200 in accordance with one embodiment.

Figure 3:
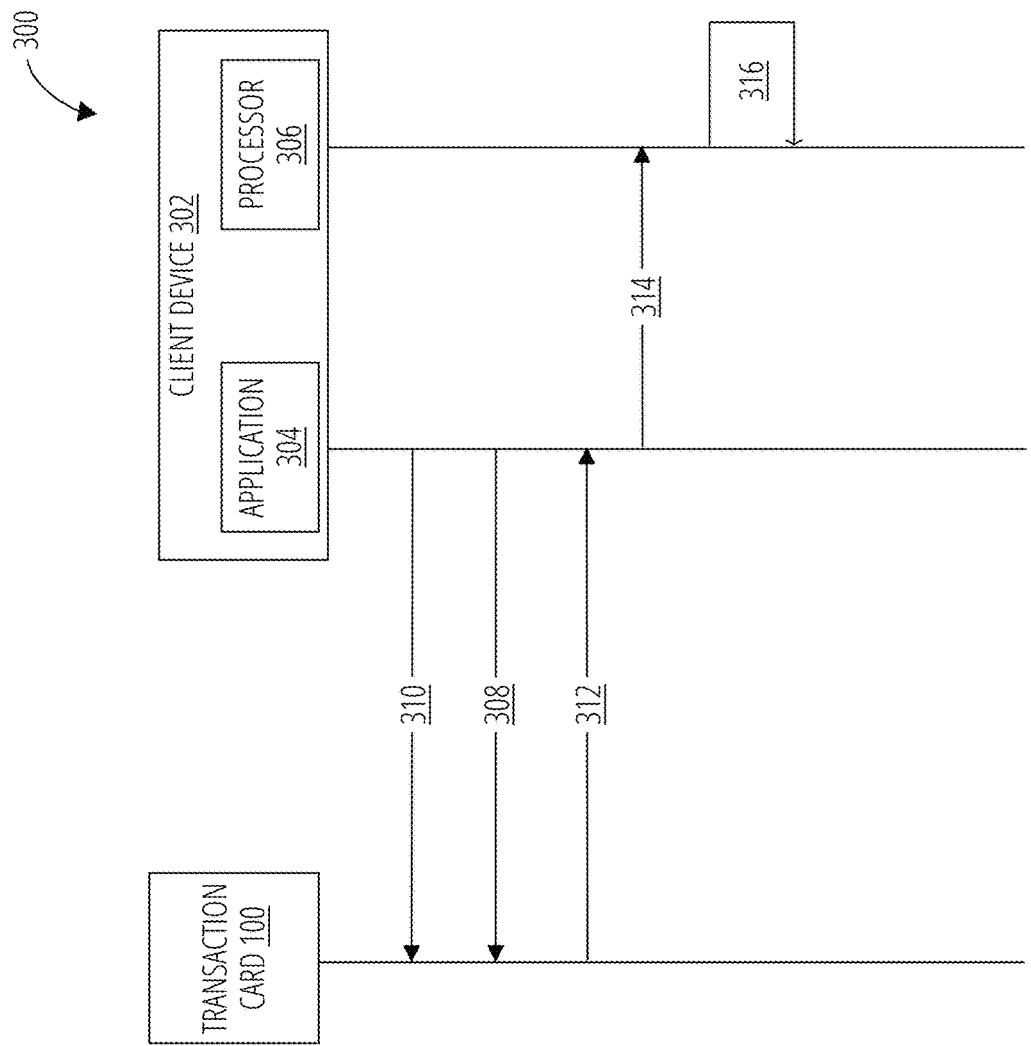

FIG. 3 illustrates a sequence flow 300 in accordance with one embodiment.

Figure 4:
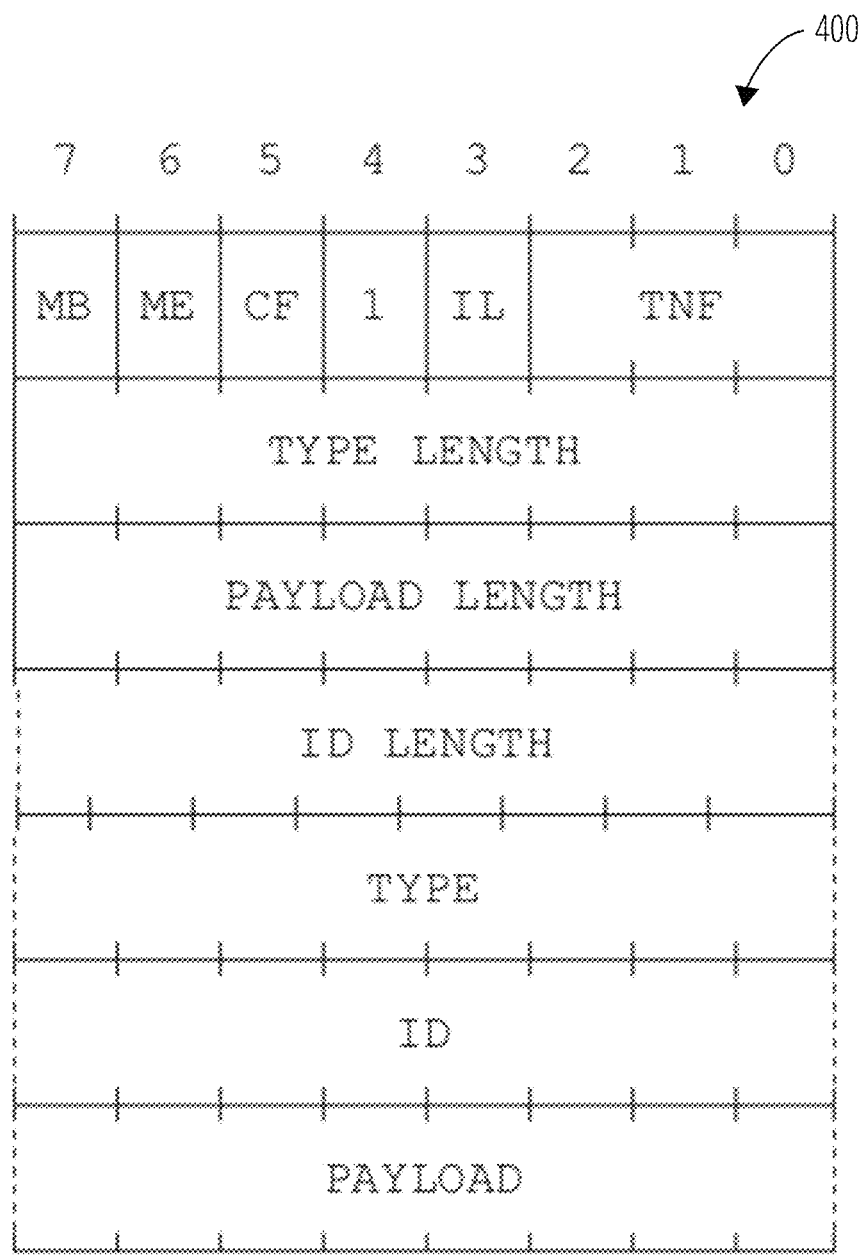

FIG. 4 illustrates a data structure 400 in accordance with one embodiment.

Figure 5:
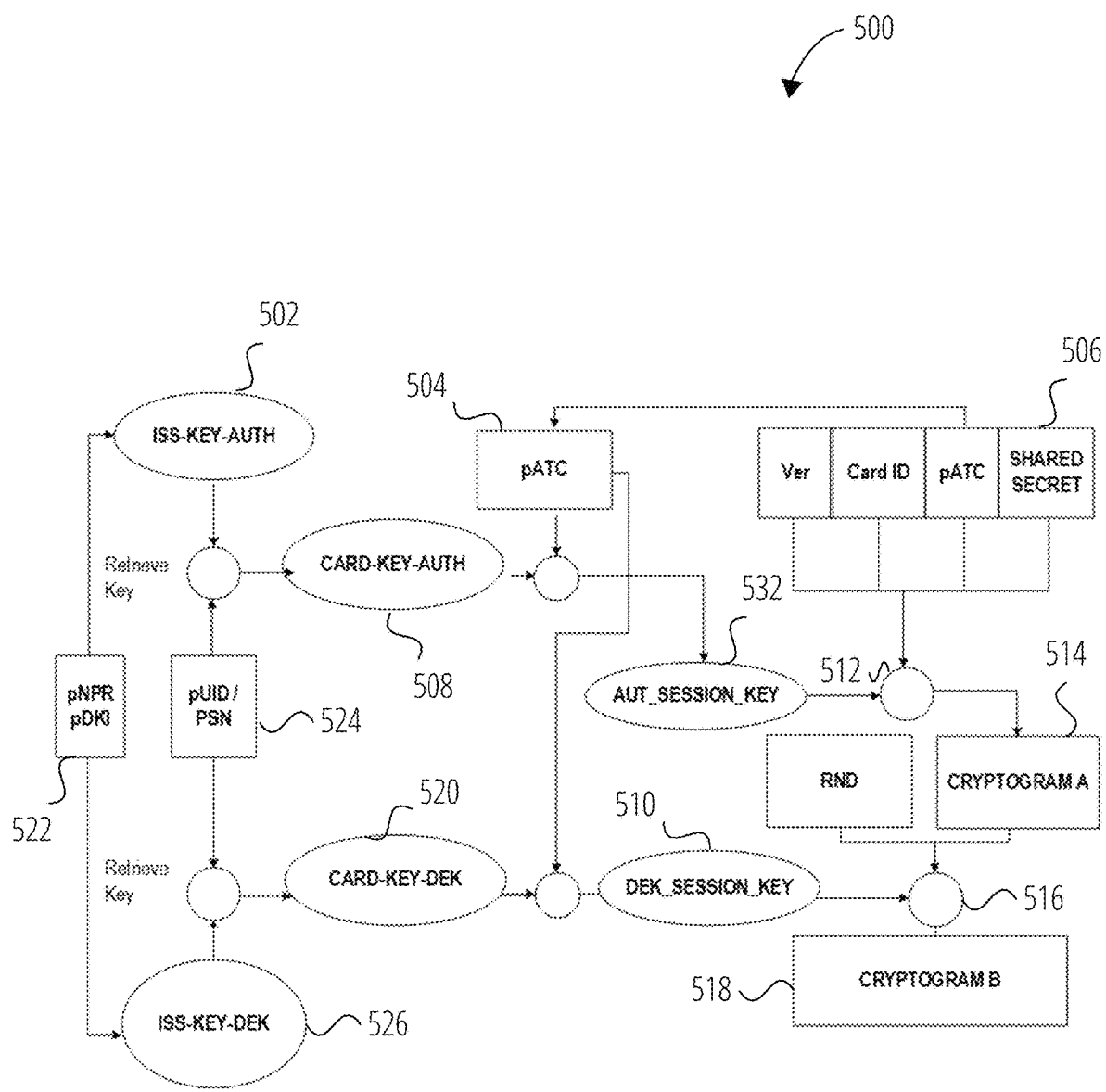

FIG. 5 is a diagram of a key system according to an example embodiment.

Figure 6:
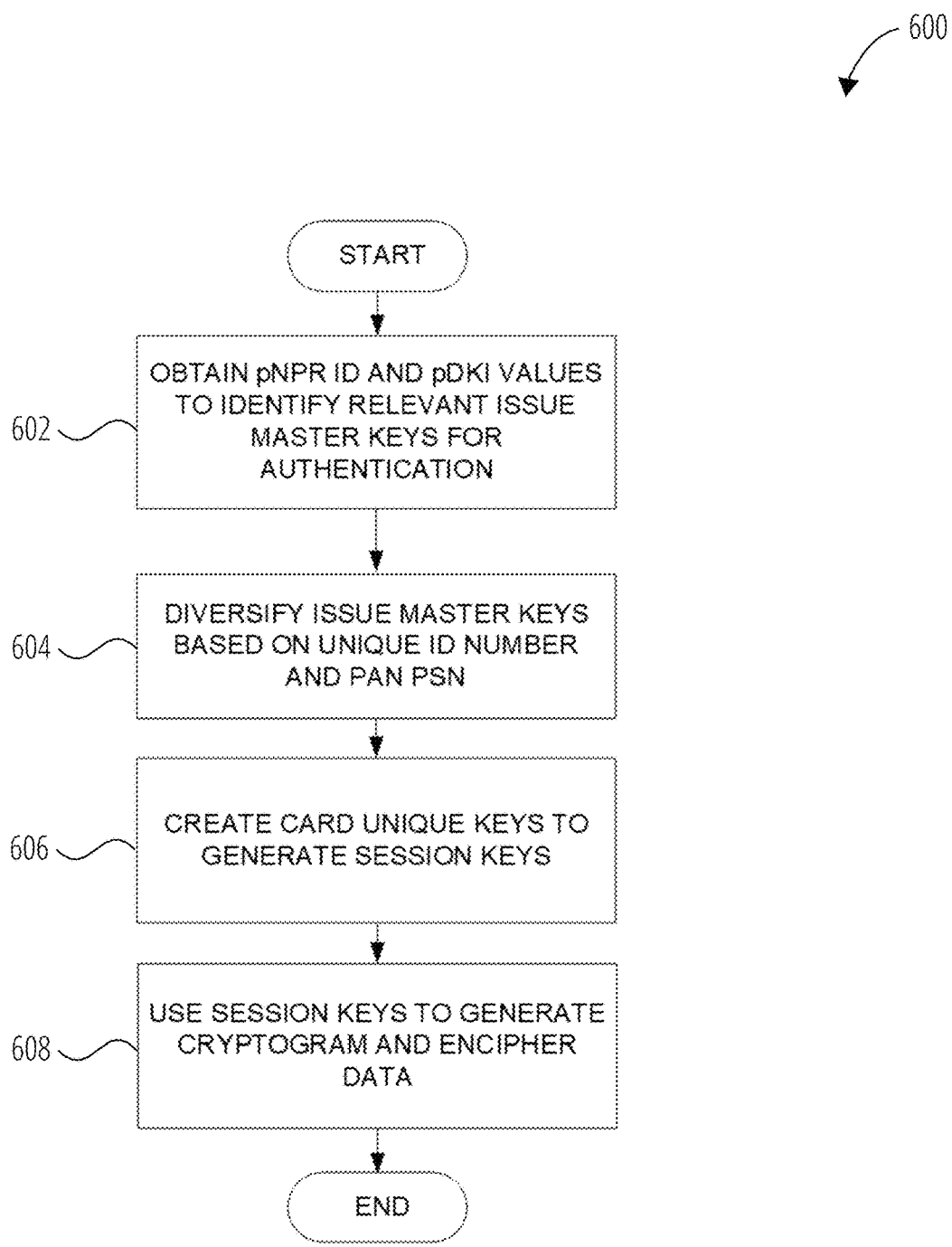

FIG. 6 is a flowchart of a method of generating a cryptogram according to an example embodiment.

Figure 7:
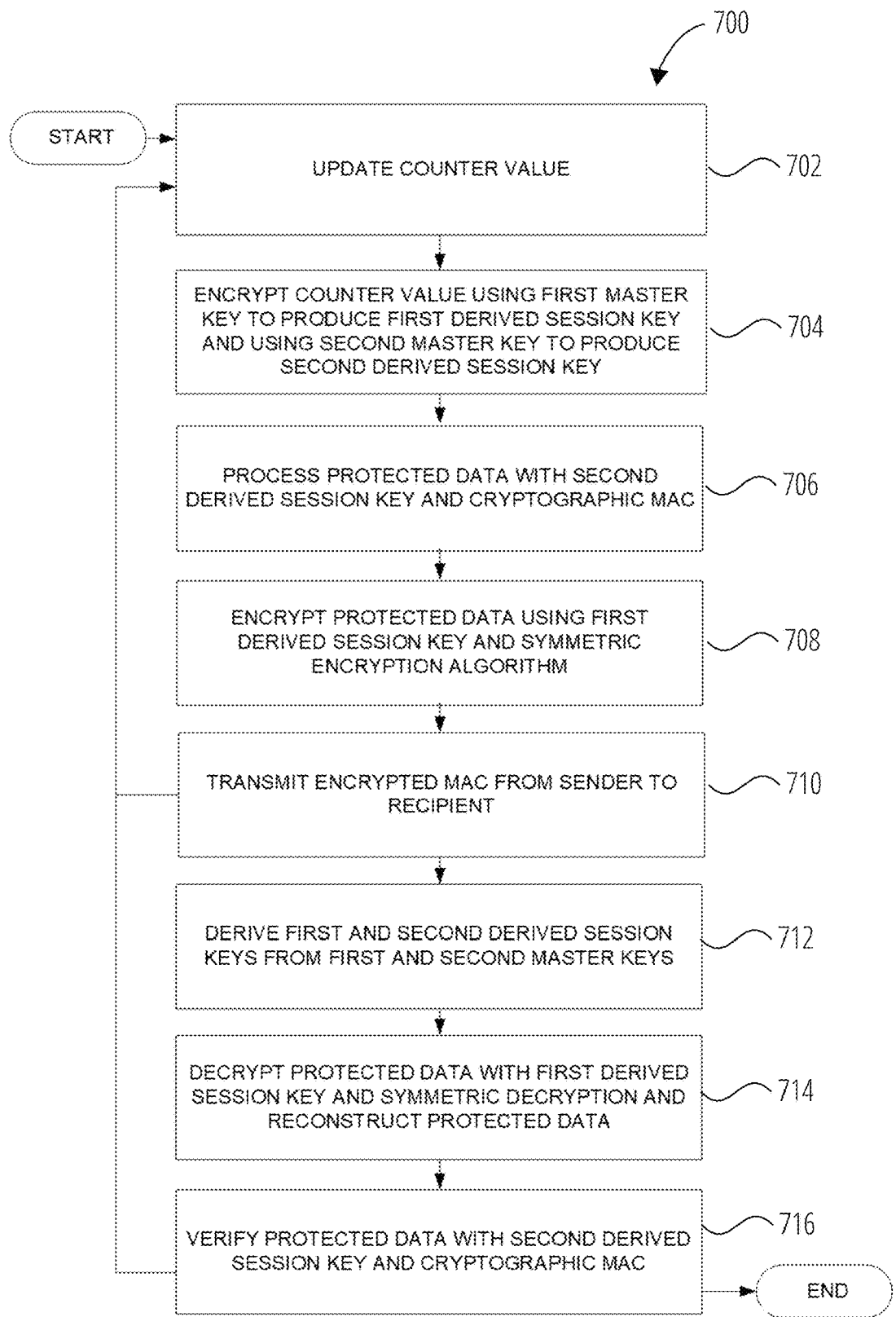

FIG. 7 is a flowchart of a method for key diversification according to an example embodiment.

Figure 8:
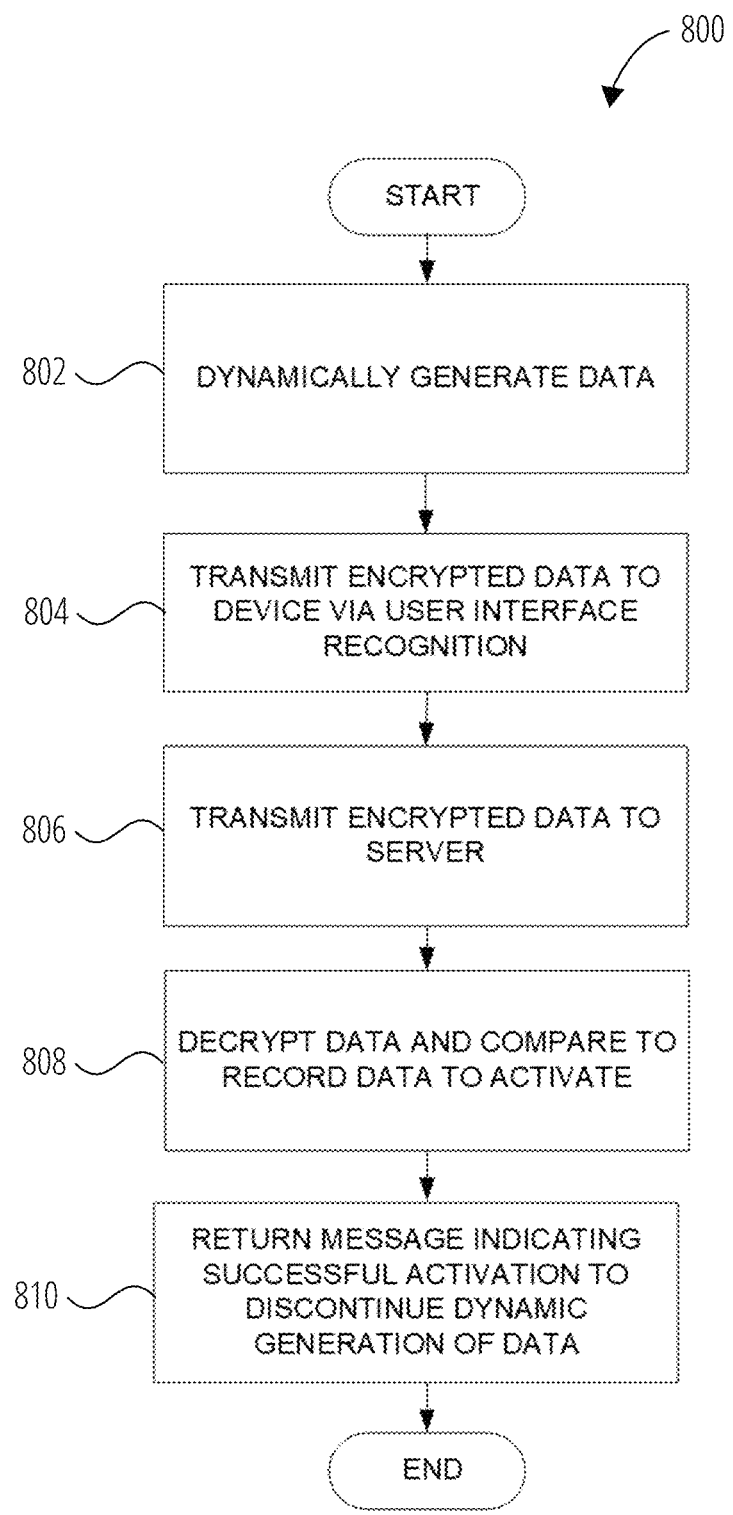

FIG. 8 is a flowchart of a method for card activation according to an example embodiment.

Figure 9A:
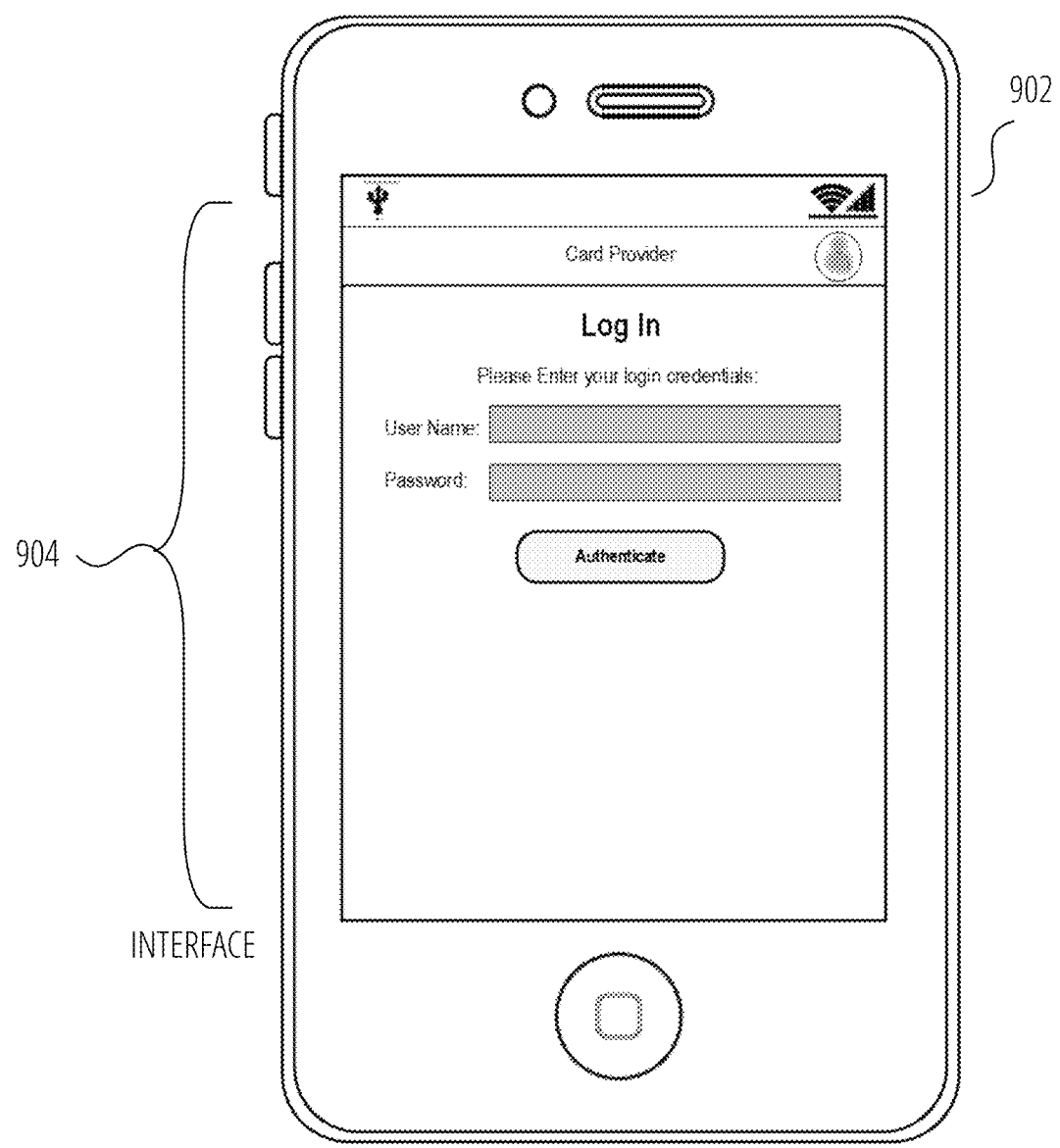

FIG. 9A depicts an example of a user interface for activating a card according to an example embodiment.

Figure 9B:
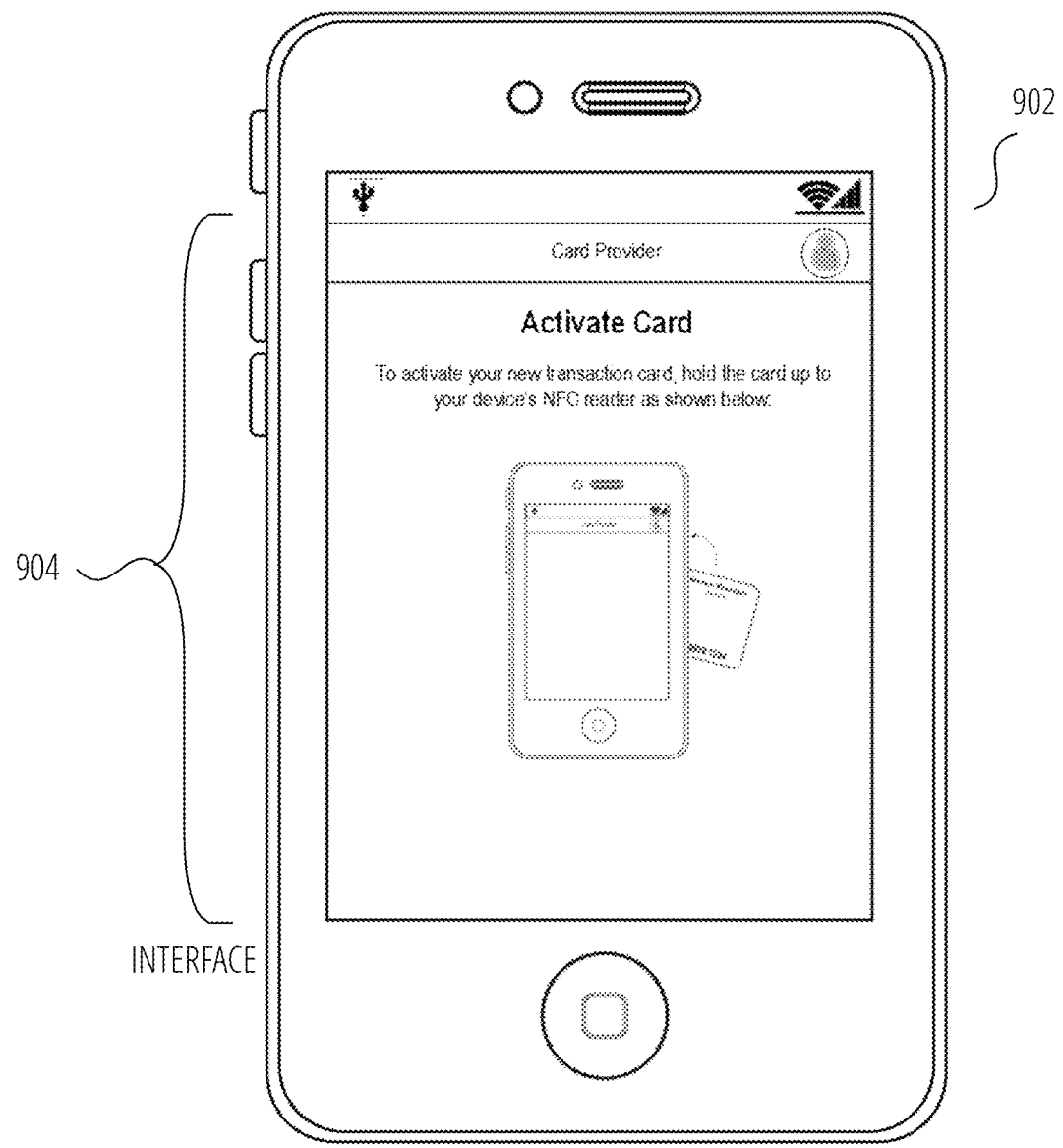

FIG. 9B depicts an example of a user interface for activating a card according to an example embodiment.

Figure 9C:
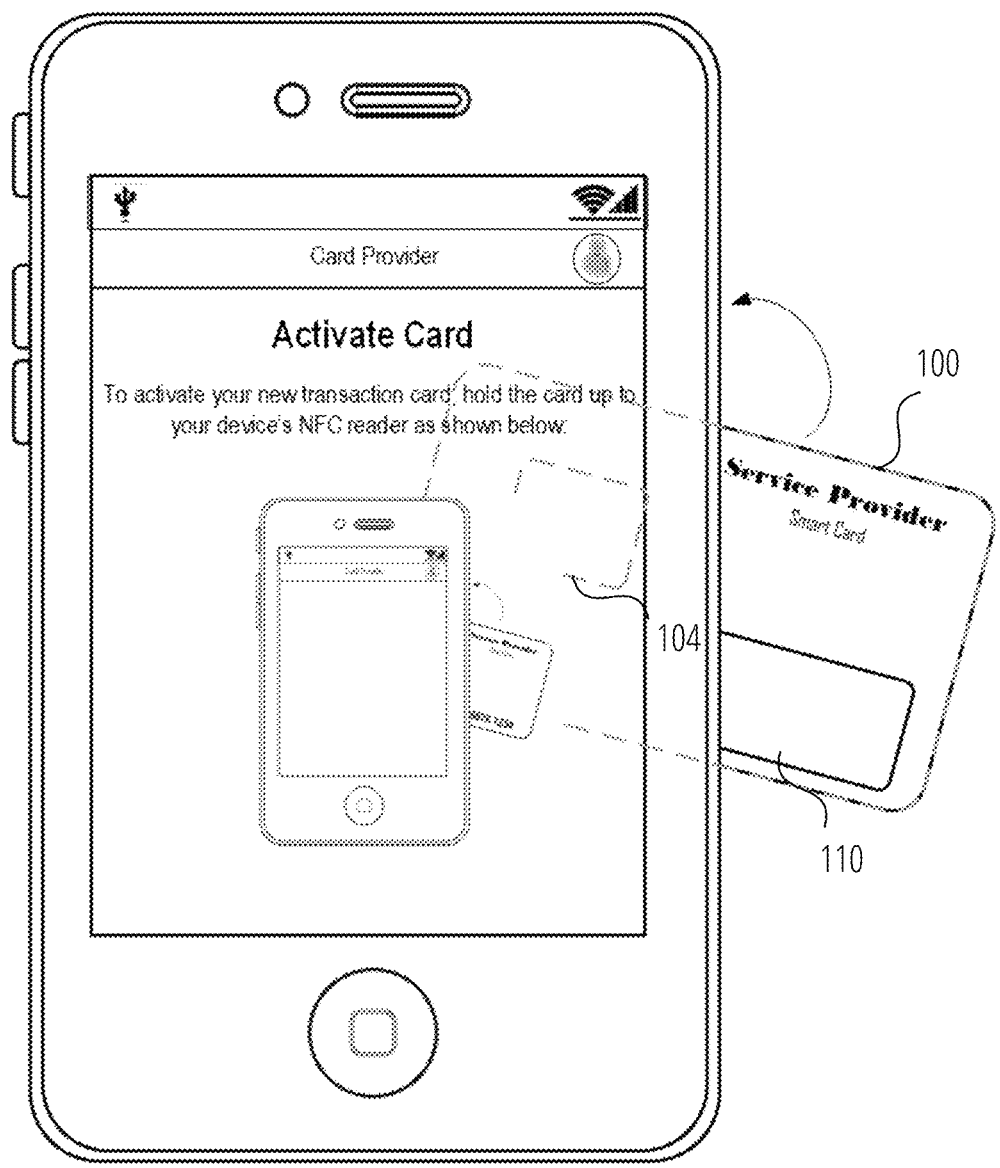

FIG. 9C depicts an example of a user interface for activating a card according to an example embodiment.

Figure 9D:

FIG. 9D depicts an example of a user interface for activating a card according to an example embodiment.

Figure 10:
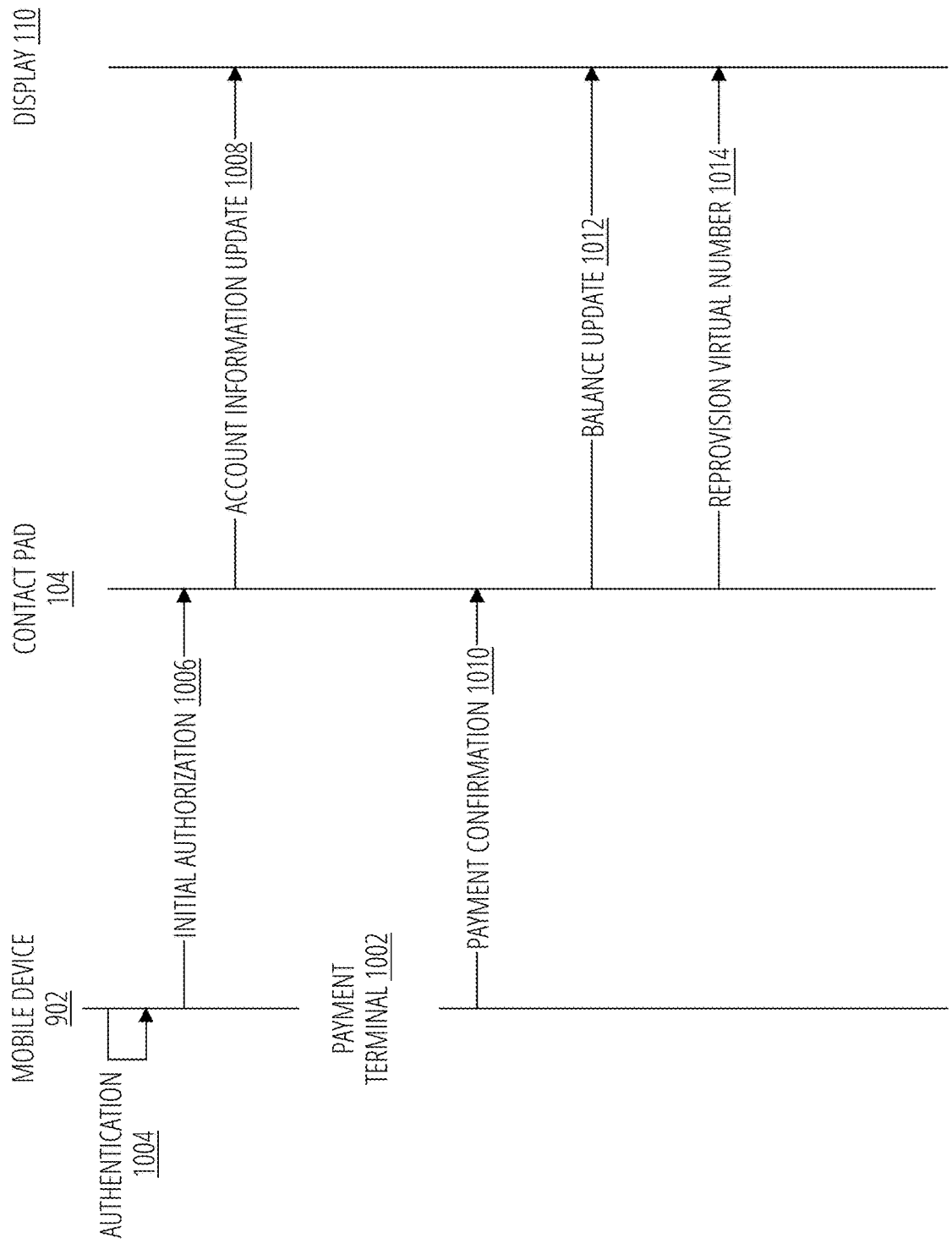

FIG. 10 is a data flow diagram depicting exemplary applications of an updateable display in accordance with an example embodiment.

Figure 11:
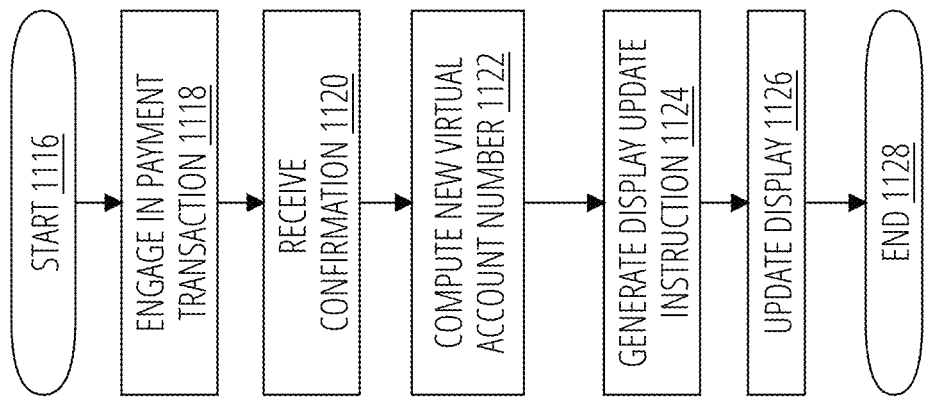

FIG. 11A is a flowchart depicting a method for updating a display during card activation in accordance with an example embodiment.

FIG. 11B is a flowchart depicting a method for updating a display during a transaction in accordance with an example embodiment.

Figure 12:
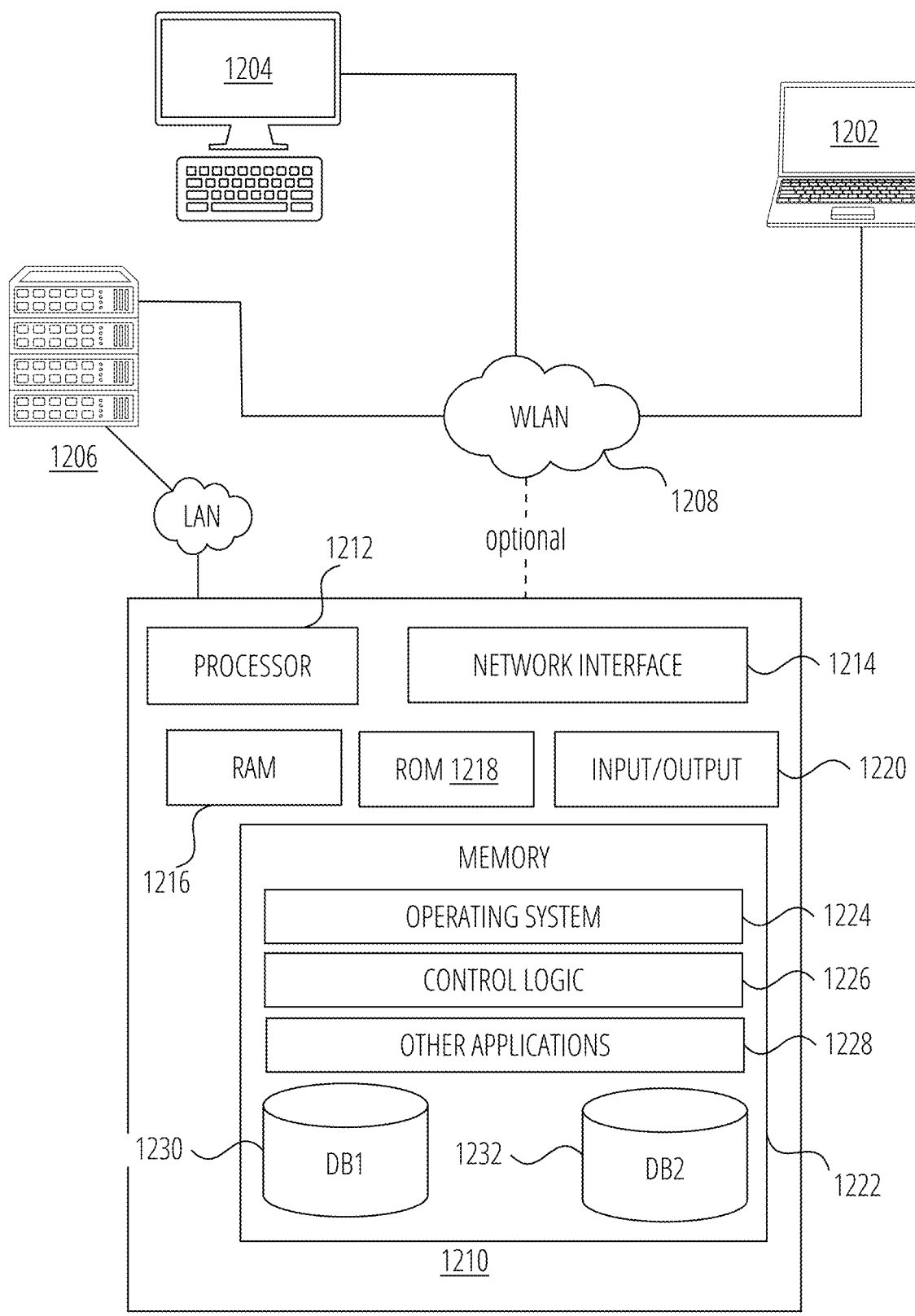

FIG. 12 depicts an illustrative computer system architecture that may be used to practice exemplary embodiments described herein.

DETAILED DESCRIPTION

FIG. 1 illustrates an example configuration of a transaction card 100, which may include a contactless card, a payment card, such as a credit card, debit card, or gift card, issued by a service provider as displayed as service provider indicia 102 on the front or back of the transaction card 100. In some examples, the transaction card 100 is not related to a payment card, and may include, without limitation, an identification card. In some examples, the transaction card may include a dual interface contactless payment card, a rewards card, and so forth. The transaction card 100 may include a substrate 108, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transaction card 100 may have physical characteristics compliant with the ID-1 format of the ISO/IEC 7816 standard, and the transaction card may otherwise be compliant with the ISO/IEC 14443 standard. However, it is understood that the transaction card 100 according to the present disclosure may have different characteristics, and the present disclosure does not require a transaction card to be implemented in a payment card.

The transaction card 100 may also include identification information 106 displayed on the front and/or back of the card, and a contact pad 104. The contact pad 104 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The transaction card 100 may also include processing circuitry, antenna and other components as will be further discussed in FIG. 2. These components may be located behind the contact pad 104 or elsewhere on the substrate 108, e.g. within a different layer of the substrate 108, and may electrically and physically coupled with the contact pad 104. The transaction card 100 may also include a magnetic strip or tape, which may be located on the back of the card (not shown in FIG. 1). The transaction card 100 may also include a Near-Field Communication (NFC) device coupled with an antenna capable of communicating via the NFC protocol. Embodiments are not limited in this manner.

The transaction card 100 may also include a display 110 electrically connected to the contact pad 104 via an electrical connection 112. The display may be a low-power display that can be electrically charged using energy derived from wireless communication with the contact pad 104. For example, when the contact pad implements a near field communication (NFC) or similar protocol, the radio waves of the NFC transmission may provide sufficient energy to power the functionality of the contact pad and the display 110. By way of example a typical wireless communication may conduct approximately 1-3 V (roughly in the 10-100 mA range) to the contact pad 104. Some of this energy may be diverted via the electrical connection 112 to the display 110 in order to update the display 110.

The display 110 may be any type of low-energy display suitable for use with a transaction card 100. Preferably, the display 110 will be made of a sufficiently durable material (such as a flexible ceramic) so that it is capable of withstanding daily use while remaining relatively thin. The display 110 should preferably not be highly sensitive to pressure. Further, it is preferable that the display 110 requires little to no energy to maintain its state once updated. Examples of suitable types of displays 110 include electrophoretic (e.g., "e-ink") displays, which generally require no energy to maintain their state once set, and memory liquid crystal diode ("memory LCD") displays, which may require a small amount of energy to maintain their state. Electrophoretic displays may be particularly well-suited to displaying information on a long-term or semi-permanent basis (e.g., an account holder name, card expiration date, card number, etc.), whereas a memory LCD display might be well-suited to displaying transient information that fades out over a period of time, such as a temporary display of an account balance, account fraud status, temporary personal identification number ("PIN") for use with card authentication, credit score, etc.

Because a memory LCD generally requires only a small amount of power to maintain its state, the power provided by the wireless communication may be supplemented by a capacitor 114 that provides sufficient energy to keep the display 110 powered. The capacitor 114 may also be used to supplement the power derived from the wireless communication when updating the display—for instance, although electrophoretic displays do not generally require power to maintain their state, in some cases they may require a relatively large amount of power to change state. The capacitor 114 may be used to supplement the power derived from the wireless communication to perform the update. In some embodiments, power may be conserved by updating only a part of the display with the most relevant information. Subsequent transactions may be used to update additional parts of the display.

It is contemplated that the wireless communication may originate at a mobile device or payment terminal, although other types of devices could also be used to perform the wireless communication. The amount of power available when performing wireless communication with a mobile device may be less than the amount available when communicating with a desktop computer or payment terminal. When excess energy is available, it may be stored in the capacitor 114 and drawn off when a lower-power wireless communication is received.

The transaction card 100 may include one or multiple displays 110. If multiple displays 110 are provided, the displays 110 may be of the same or different types. Although FIG. 1 depicts the display 110 as covering only a portion of the card, it is contemplated that an entire card face or faces might be made up of a display.

As an addition or alternative to displaying account information, the display 110 may show other types of information as well, such as a decorative background, a picture of the account holder, etc. In some embodiments, the display 110 may show access credentials for an event (such as a concert or sporting event), a scannable graphic (such as a QR code or bar code) that could serve as a coupon or voucher, an access code for gaining entry to an airport lounge, or other types of information.

As illustrated in FIG. 2, the contact pad 104 of transaction card 100 may include processing circuitry 216 for storing, processing, and communicating information, including a processor 202, a memory 204, and one or more interface(s) 206. It is understood that the processing circuitry 216 may contain additional components, including processors, memories, error and parity/CRC checkers, data encoders, anticollision algorithms, controllers, command decoders, security primitives and tamperproofing hardware, as necessary to perform the functions described herein.

The memory 204 may be a read-only memory, write-once read-multiple memory or read/write memory, e.g., RAM, ROM, and EEPROM, and the transaction card 100 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 204 may be encrypted memory utilizing an encryption algorithm executed by the processor 202 to encrypted data.

The memory 204 may be configured to store one or more applet(s) 208, one or more counter(s) 210, a customer identifier 214, and the account number(s) 212, which may be virtual account numbers. The one or more applet(s) 208 may comprise one or more software applications configured to execute on one or more contactless cards, such as a Java® Card applet. However, it is understood that applet(s) 208 are not limited to Java Card applets, and instead may be any software application operable on contactless cards or other devices having limited memory. The one or more counter(s) 210 may comprise a numeric counter sufficient to store an integer. The customer identifier 214 may comprise a unique alphanumeric identifier assigned to a user of the transaction card 100, and the identifier may distinguish the user of the contactless card from other contactless card users. In some examples, the customer identifier 214 may identify both a customer and an account assigned to that customer and may further identify the transaction card 100 associated with the customer's account. As stated, the account number(s) 212 may include thousands of one-time use virtual account numbers associated with the transaction card 100. An applet(s) 208 of the transaction card 100 may be configured to manage the account number(s) 212 (e.g., to select an account number(s) 212, mark the selected account number(s) 212 as used, and transmit the account number(s) 212 to a mobile device for autofilling by an autofilling service.

The processor 202 and memory elements of the foregoing exemplary embodiments are described with reference to the contact pad 104, but the present disclosure is not limited thereto. It is understood that these elements may be implemented outside of the contact pad 104 or entirely separate from it, or as further elements in addition to processor 202 and memory 204 elements located within the contact pad 104.

In some examples, the transaction card 100 may comprise one or more antenna(s) 218. The one or more antenna(s) 218 may be placed within the transaction card 100 and around the processing circuitry 216 of the contact pad 104. For example, the one or more antenna(s) 218 may be integral with the processing circuitry 216 and the one or more antenna(s) 218 may be used with an external booster coil. As another example, the one or more antenna(s) 218 may be external to the contact pad 104 and the processing circuitry 216.

In an embodiment, the coil of transaction card 100 may act as the secondary of an air core transformer. The terminal may communicate with the transaction card 100 by cutting power or amplitude modulation. The contactless card 101 may infer the data transmitted from the terminal using the gaps in the contactless card's power connection, which may be functionally maintained through one or more capacitors. The transaction card 100 may communicate back by switching a load on the contactless card's coil or load modulation. Load modulation may be detected in the terminal's coil through interference. More generally, using the antenna(s) 218, processor 202, and/or the memory 204, the contactless card 101 provides a communications interface to communicate via NFC, Bluetooth, and/or Wi-Fi communications.

As explained above, transaction card 100 may be built on a software platform operable on smart cards or other devices having limited memory, such as JavaCard, and one or more applications or applets may be securely executed. Applet(s) 208 may be added to contactless cards to provide a one-time password (OTP) for multifactor authentication (MFA) in various mobile application-based use cases. Applet(s) 208 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 208 may be configured to encode the OTP as an NDEF type 4 well known type text tag. In some examples, NDEF messages may comprise one or more records. The applet(s) 208 may be configured to add one or more static tag records in addition to the OTP record.

In some examples, the one or more applet(s) 208 may be configured to emulate an RFID tag. The RFID tag may include one or more polymorphic tags. In some examples, each time the tag is read, different cryptographic data is presented that may indicate the authenticity of the contactless card. Based on the one or more applet(s) 208, an NFC read of the tag may be processed, the data may be transmitted to a server, such as a server of a banking system, and the data may be validated at the server.

In some examples, the transaction card 100 and server may include certain data such that the card may be properly identified. The transaction card 100 may include one or more unique identifiers (not pictured). Each time a read operation takes place, the counter(s) 210 may be configured to increment. In some examples, each time data from the transaction card 100 is read (e.g., by a mobile device), the counter(s) 210 is transmitted to the server for validation and determines whether the counter(s) 210 are equal (as part of the validation) to a counter of the server.

The one or more counter(s) 210 may be configured to prevent a replay attack. For example, if a cryptogram has been obtained and replayed, that cryptogram is immediately rejected if the counter(s) 210 has been read or used or otherwise passed over. If the counter(s) 210 has not been used, it may be replayed. In some examples, the counter that is incremented on the card is different from the counter that is incremented for transactions. The contactless card 101 is unable to determine the application transaction counter(s) 210 since there is no communication between applet(s) 208 on the transaction card 100. In some examples, the transaction card 100 may comprise a first applet 440-1, which may be a transaction applet, and a second applet 440-2. Each applet 440-1 and 440-2 may comprise a respective counter 104.

In some examples, the counter(s) 210 may get out of sync. In some examples, to account for accidental reads that initiate transactions, such as reading at an angle, the counter(s) 210 may increment but the application does not process the counter(s) 210. In some examples, when the mobile device 10 is woken up, NFC may be enabled and the device 110 may be configured to read available tags, but no action is taken responsive to the reads.

To keep the counter(s) 210 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 210 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 210 increases in the appropriate sequence, then it possible to know that the user has done so.

The key diversification technique described herein with reference to the counter(s) 210, master key, and diversified key, is one example of encryption and/or decryption a key diversification technique. This example key diversification technique should not be considered limiting of the disclosure, as the disclosure is equally applicable to other types of key diversification techniques.

During the creation process of the transaction card 100, two cryptographic keys may be assigned uniquely per card. The cryptographic keys may comprise symmetric keys which may be used in both encryption and decryption of data. Triple DES (3DES) algorithm may be used by EMV and it is implemented by hardware in the transaction card 100. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

FIG. 3 is a timing diagram illustrating an example sequence for providing authenticated access according to one or more embodiments of the present disclosure. Sequence flow 300 may include transaction card 100 and client device 302, which may include an application 304 and processor 306.

At line 310, the application 304 communicates with the transaction card 100 (e.g., after being brought near the transaction card 100). Communication between the application 304 and the transaction card 100 may involve the transaction card 100 being sufficiently close to a card reader (not shown) of the client device 302 to enable NFC data transfer between the application 304 and the transaction card 100.

At line 308, after communication has been established between client device 302 and transaction card 100, transaction card 100 generates a message authentication code (MAC) cryptogram. In some examples, this may occur when the transaction card 100 is read by the application 304. In particular, this may occur upon a read, such as an NFC read, of a near field data exchange (NDEF) tag, which may be created in accordance with the NFC Data Exchange Format. For example, a reader application, such as application 304, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the transaction card 100 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 304 may be configured to transmit a request to transaction card 100, the request comprising an instruction to generate a MAC cryptogram.

At line 312, the transaction card 100 sends the MAC cryptogram to the application 304. In some examples, the transmission of the MAC cryptogram occurs via NFC, however, the present disclosure is not limited thereto. In other examples, this communication may occur via Bluetooth, Wi-Fi, or other means of wireless data communication. At line 314, the application 304 communicates the MAC cryptogram to the processor 306.

At line 316, the processor 306 verifies the MAC cryptogram pursuant to an instruction from the application 122. For example, the MAC cryptogram may be verified, as explained below. In some examples, verifying the MAC cryptogram may be performed by a device other than client device 302, such as a server of a banking system in data communication with the client device 302. For example, processor 306 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

FIG. 4 illustrates an NDEF short-record layout (SR=1) data structure 400 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 5 illustrates a diagram of a system 500 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 502, 526 may be required for each part of the portfolio on which the one or more applets is issued. For example, the first master key 502 may comprise an Issuer Cryptogram Generation/Authentication Key (Iss-Key-Auth) and the second master key 526 may comprise an Issuer Data Encryption Key (Iss-Key-DEK). As further explained herein, two issuer master keys 502, 526 are diversified into card master keys 508, 520, which are unique for each card. In some examples, a network profile record ID (pNPR) 522 and derivation key index (pDKI) 524, as back office data, may be used to identify which Issuer Master Keys 502, 526 to use in the cryptographic processes for authentication. The system performing the authentication may be configured to retrieve values of pNPR 522 and pDKI 524 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 508 and Card-Key-Dek 520). The session keys (Aut-Session-Key 532 and DEK-Session-Key 510) may be generated by the one or more applets and derived by using the application transaction counter (pATC) 504 with one or more algorithms. To fit data into the one or more algorithms, only the 2 low order bytes of the 4-byte pATC 504 is used. In some examples, the four byte session key derivation method may comprise: F1: =PATC(lower 2 bytes)||'F0'||'00'||PATC (four bytes) F1: =PATC(lower 2 bytes)||'0F'||'00'||PATC (four bytes) SK:={(ALG (MK) [F1])||ALG (MK)[F2]}, where ALG may include 3DES ECB and MK may include the card unique derived master key.

As described herein, one or more MAC session keys may be derived using the lower two bytes of pATC 504 counter. At each tap of the contactless card, pATC 504 is configured to be updated, and the card master keys Card-Key-AUTH 508 and Card-Key-DEK 520 are further diversified into the session keys Aut-Session-Key 532 and DEK-Session-KEY 510. pATC 504 may be initialized to zero at personalization or applet initialization time. In some examples, the pATC counter 504 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 532. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 532, as explained above. As explained above, the low order two bytes of the counter may be used to diversify for the one or more MAC session keys. As explained below, AUT-Session-Key 532 may be used to MAC data 506, and the resulting data or cryptogram A 514 and random number RND may be encrypted using DEK-Session-Key 510 to create cryptogram B or output 518 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 510 derived from the Card-Key-DEK 520. In this case, the ATC value for the session key derivation is the least significant byte of the counter pATC 504.

The format below represents a binary version example embodiment. Further, in some examples, the first byte may be set to ASCII 'A'.

| Message Format | | | | |
|---|---|---|---|---|
| 1 | 2 | 4 | 8 | 8 |
| 0x43 (Message Type 'A') | Version | pATC | RND | Cryptogram A (MAC) |

| Cryptogram A (MAC) 8 bytes MAC of | | | | |
|---|---|---|---|---|
| 2 | 8 | 4 | 4 | 18 bytes input data |
| Version | pUID | pATC | Shared Secret | |

| Message Format | | | |
|---|---|---|---|
| 1 | 2 | 4 | 16 |
| 0x43 (Message Type 'A') | Version | pATC | Cryptogram B |

| Cryptogram A (MAC) 8 bytes MAC of | | | | |
|---|---|---|---|---|
| 2 | 8 | 4 | 4 | 18 bytes input data |
| Version | pUID | pATC | Shared Secret | |

| Cryptogram B 16 Sym Encryption of | |
|---|---|
| 8 | 8 |
| RND | Cryptogram A |

Another exemplary format is shown below. In this example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |

| 8 bytes | | | | |
|---|---|---|---|---|
| 8 | 8 | 4 | 4 | 18 bytes input data |
| pUID | pUID | pATC | Shared Secret | |

| Message Format | | | |
|---|---|---|---|
| 2 | 8 | 4 | 16 |
| Version | pUID | pATC | Cryptogram B |
| 8 bytes | | | |
| 8 | 4 | 4 | 18 bytes input data |
| pUID  pUID | | pATC | Shared Secret |
| Cryptogram B 16 Sym Encryption of | | | |
| 8 | | 8 | |
| RND | | Cryptogram A | |

The UID field of the received message may be extracted to derive, from master keys Iss-Key-AUTH 502 and Iss-Key-DEK 526, the card master keys (Card-Key-Auth 508 and Card-Key-DEK 520) for that particular card. Using the card master keys (Card-Key-Auth 508 and Card-Key-DEK 520), the counter (pATC) field of the received message may be used to derive the session keys (Aut-Session-Key 532 and DEK-Session-Key 510) for that particular card. Cryptogram B 518 may be decrypted using the DEK-Session-KEY, which yields cryptogram A 514 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 514, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 532. The input data 506 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 512, data 506 is processed through the MAC using Aut-Session-Key 532 to produce MAC output (cryptogram A) 514, which is encrypted.

In order to provide additional protection against brute force attacks exposing the keys on the card, it is desirable that the MAC cryptogram 514 be enciphered. In some examples, data or cryptogram A 514 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 510. In the encryption operation 516, data or cryptogram A 514 and RND are processed using DEK-Session-Key 510 to produce encrypted data, cryptogram B 518. The data 514 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 6 illustrates a method 600 for generating a cryptogram. For example, at block 602, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 604, Issuer Master Keys may be diversified by combining them with the card's unique ID number (pUID)

and the PAN sequence number (PSN) of one or more applets, for example, a payment applet.

At block 606, Card-Key-Auth and Card-Key-DEK (unique card keys) may be created by diversifying the Issuer Master Keys to generate session keys which may be used to generate a MAC cryptogram.

At block 608, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

FIG. 7 depicts an exemplary process 700 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 702, and other data, such as data to be protected, which it may secure share with the recipient.

At block 704, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 706, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 708, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 710, the encrypted MAC is transmitted, from the sender to the recipient, with sufficient information to identify additional secret information (such as shared secret, master keys, etc.), for verification of the cryptogram.

At block 712, the recipient uses the received counter value to independently derive the two derived session keys from the two master keys as explained above.

At block 714, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 716, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 702) and a new set of session keys may be created (at block 710). In some examples, the combined random data may be discarded.

FIG. 8 illustrates a method 800 for card activation according to an example embodiment. For example, card activation may be completed by a system including a card, a device, and one or more servers. The contactless card, device, and one or more servers may reference same or similar components that were previously explained a, such as transaction card 100, client device 302, and a server.

In block 802, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 804, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 806, the one or more portions of the data may be communicated to one or more servers, such as a card issuer server. For example, one or more encrypted portions of the data may be transmitted from the device to the card issuer server for activation of the card.

In block 808, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 810, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

FIG. 9A-FIG. 9D depict exemplary user interfaces 904 that may be used to update a display on a transaction card during an initial authentication process, such as the one described above. A cardholder may receive a card with an initially blank display. In order to activate the card and cause the card's display to reflect their account information, the user may log in to an application associated with the card issuing institution on their mobile device 902, as shown in FIG. 9A. Logging in may authenticate the user with the financial institution, thus providing a measure of assurance that the card is in the possession of the intended user and reducing the risk of fraud.

When the user has signed into their account in the application, they may be presented with an option to activate their transaction card 100. If they opt to do so, instructions for performing the activation may be presented in the interface 904, as shown in FIG. 9B. The instructions may ask the user to hold the contact pad 104 of the transaction card 100 up to a designated spot on their mobile device 902, such as an NFC reader. The user may then proceed to initiate wireless communication by holding the card to the designated spot, as shown in FIG. 9C.

The mobile device 902 may issue the wireless communication (e.g., an NFC transaction), which may include transmitting an instruction to the contact pad 104 to initially authorize the card for use. This may follow a procedure such as the one outlined above in connection with FIG. 8. When the account information is provided to the processor 202 of the contact pad 104, the processor may generate appropriate instructions to update the display 110 with the account information. Some of the energy exchanged as part of the wireless communication may power the processor 202, while some may be diverted to the display 110 in order to perform the updating (and/or the capacitor 114).

In some cases, if the user entered incorrect information (e.g., the user failed to correctly authenticate in the application), or if the user's account was associated with a fraud alert or other problem, the display may be updated with a message such as "CARD IS NOT VALID" instead of the account information. Similarly, the card might be updated with false information, such as a false identification number that, when used, alerts the vendor and/or issuing institution that a fraud is being attempted.

FIG. 10 depicts an exemplary flow diagram showing several instances in which the display might be updated. FIG. 10 is not meant to be exhaustive, and other uses for the display (such as those already described above) are also contemplated.

As noted above with respect to FIG. 9A, when the card is initially provisioned the user may perform an authentication 1004 on their mobile device 902. The mobile device 902 may then issue an initial authorization 1006 to the contact pad 104 using a wireless communication protocol that also transfers some energy to the contact pad 104. The processor 202 of the contact pad 104 may then generate an account information update 1008 that is used to update the display 110 with the account information for the card.

After the card is activated, it may be used at a payment terminal 1002. When the payment terminal 1002 authorizes the transaction, a payment confirmation 1010 may be sent to the contact pad 104. The payment confirmation 1010 may include an indication that the transaction was completed, and may optionally include additional details such as account information, balances, fraud status, an updated credit score, etc. This information may optionally used to update the display by issuing a balance update 1012, which may cause the display to show a current account balance (or any other suitable information). The information displayed at the conclusion of a transaction may be user-configurable (e.g., via an application on the mobile device 902).

Optionally, upon identifying that a transaction with the current card identification number has been concluded, the contact pad 104 may be provided with or may generate a new virtual card number. The display may be instructed to reprovision the virtual number 1014 in order to be updated with the new number. A virtual card number may represent a temporary identification number assigned to the card and used for a predetermined (e.g., one) number of transactions. Virtual card numbers may be substitutes for, or may be used in place of, a permanent card number. They may be particularly useful when shopping online, where the integrity of the transaction cannot be guaranteed. If a user wishes to use a virtual number and then force a refresh of the number on the card without using a payment terminal (as might be the case when the transaction is an online transaction), the user may be provided with an option for updating the card's number through the mobile device 902.

FIG. 11A depicts an example of logic for initially authorizing a card for use with an account. The logic may be implemented as instructions stored on a non-transitory computer-readable medium. The logic may be implemented by one or more computing devices, and some of the depicted blocks may be performed by or with the contact pad 104 described above.

Processing starts at start block 1102. At block 1104, a device may authenticate a user's rights to access their user account. For example, the user may log into their account on an application associated with the institution that issued the transaction card 100. They user may log into the application on a mobile device 902, another personal computing device, a kiosk or terminal, or some other type of device.

The application may provide the user with a number of options. For example, if a new card has been sent to the user but has not yet been activated, the application may provide a selectable option to activate the card. If the user selects this option, then the application may receive, at block 1106, an instruction to activate the card. The device running the application may present the user with instructions to hold the card's contact pad to a wireless transmitter, such as an NFC transmitter, on the device.

At block 1108 the device may engage in wireless communication with the contact pad 104 on the transaction card 100 in order to transmit an activation instruction to the contact pad 104. At block 1110, the processor 202 on the transaction card 100 may use energy derived from the wireless communication to perform any requisite activation steps (see the discussion of FIG. 8, above), and excess energy may be used to power the display 110. Any energy not needed by the processor 202 or the display 110 may be stored in a capacitor 114. If insufficient energy exists to update the display 110, the display 110 may be partially updated until more energy is available. To that end, some information for the display (e.g., the account number) may be flagged as high priority, while other information (such as the user's account status) may be flagged a low priority. The display may first be updated with high priority information, and may defer updating low priority information until more power is available.

When performing the activation steps, the contact pad 104 may be provided with, or may compute, information used to update the display. This information may include, for example, the name of the account holder, the card's identification number, the card's expiration date, the card's security code, etc. At block 1112, the contact pad 104 may update the display to include this displayable information. Processing may then proceed to block 1114 and terminate.

FIG. 11A depicts an example of logic for updating a display on a transaction card in response to a transaction being performed. The logic may be implemented as instructions stored on a non-transitory computer-readable medium. The logic may be implemented by one or more computing devices, and some of the depicted blocks may be performed by or with the contact pad 104 described above.

Processing may begin at start block 1116. At block 1118, the transaction card may be used to engage in a payment transaction. Optionally, the payment transaction may involve a payment terminal with wireless communication capabilities that are activated when the card is used to engage in the transaction.

At block 1120, the contact pad 104 on the card may receive a wireless communication indicating that the transaction has been approved. Optionally, the confirmation may include account information, such as an account balance, a fraud status on the account, a credit score associated with the account, etc.

At block 1122, a new virtual identification number may optionally be generated for the card. The virtual identification number may be generated by a server associated with the institution issuing the card and may be transmitted to the payment terminal as part of authorizing the transaction; the virtual identification number may then be provided to the contact pad as part of the transaction. Alternatively or in addition, the virtual identification number may be generated by the terminal, by the user's mobile device, or by the processor 202 on the contact pad 104. The memory 204 of the contact pad 104 may optionally store a number of predetermined virtual identification numbers, and the processor 202 may retrieve the next number from the memory 204.

At block 1124, the processor 202 may generate an update instruction to update the display 110. If a new virtual identification number was generated for the card, the update instruction may include an instruction to change the existing identification number to the new number. Alternatively or in addition, any account information transmitted as part of the wireless communication may be included in the update instruction for display on the card.

The update instruction may include an indication of whether some of the information for display is intended to be ephemeral (i.e., to disappear from the display 110 after a period of time). If so, the display may be configured to erase the information, either by updating the display to a new state after the time has elapsed, or by allowing the information to simply fade away by not supplying the display with the power that would be required to maintain the information.

At block 1126, the display may be updated with the new information in response to the instruction. Processing may then proceed to end block 1128 and terminate.

FIG. 12 illustrates one example of a system architecture and data processing device that may be used to implement one or more illustrative aspects described herein in a standalone and/or networked environment. Various network nodes, such as the data server 1210, web server 1206, computer 1204, and laptop 1202 may be interconnected via a wide area network 1208 (WAN), such as the internet. Other networks may also or alternatively be used, including private intranets, corporate networks, LANs, metropolitan area networks (MANs) wireless networks, personal networks (PANs), and the like. Network 1208 is for illustration purposes and may be replaced with fewer or additional computer networks. A local area network (LAN) may have one or more of any known LAN topology and may use one or more of a variety of different protocols, such as ethernet. Devices data server 1210, web server 1206, computer 1204, laptop 1202 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1210, web server 1206, and client computer 1204, laptop 1202. Data server 1210 provides overall access, control and administration of databases and control software for performing one or more illustrative aspects described herein. Data server-data server 1210 may be connected to web server 1206 through which users interact with and obtain data as requested. Alternatively, data server 1210 may act as a web server itself and be directly connected to the internet. Data server 1210 may be connected to web server 1206 through the network 1208 (e.g., the internet), via direct or indirect connection, or via some other network. Users may interact with the data server 1210 using remote computer 1204, laptop 1202, e.g., using a web browser to connect to the data server 1210 via one or more externally exposed web sites hosted by web server 1206. Client computer 1204, laptop 1202 may be used in concert with data server 1210 to access data stored therein, or may be used for other purposes. For example, from client computer 1204, a user may access web server 1206 using an internet browser, as is known in the art, or by executing a software application that communicates with web server 1206 and/or data server 1210 over a computer network (such as the internet).

Servers and applications may be combined on the same physical machines, and retain separate virtual or logical addresses, or may reside on separate physical machines. FIG. 12 illustrates just one example of a network architecture that may be used, and those of skill in the art will appreciate that the specific network architecture and data processing devices used may vary, and are secondary to the functionality that they provide, as further described herein. For example, services provided by web server 1206 and data server 1210 may be combined on a single server.

Each component data server 1210, web server 1206, computer 1204, laptop 1202 may be any type of known computer, server, or data processing device. Data server 1210, e.g., may include a processor 1212 controlling overall operation of the data server 1210. Data server 1210 may further include RAM 1216, ROM 1218, network interface 1214, input/output interfaces 1220 (e.g., keyboard, mouse, display, printer, etc.), and memory 1222. Input/output interfaces 1220 may include a variety of interface units and drives for reading, writing, displaying, and/or printing data or files. Memory 1222 may further store operating system software 1224 for controlling overall operation of the data server 1210, control logic 1226 for instructing data server 1210 to perform aspects described herein, and other application software 1228 providing secondary, support, and/or other functionality which may or may not be used in conjunction with aspects described herein. The control logic may also be referred to herein as the data server software control logic 1226. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 1232 and a second database 1230. In some embodiments, the first database may include the second database (e.g., as a separate table, report, etc.). That is, the information can be stored in a single database, or separated into different logical, virtual, or physical databases, depending on system design. Web server 1206, computer 1204, laptop 1202 may have similar or different architecture as described with respect to data server 1210. Those of skill in the art will appreciate that the functionality of data server 1210 (or web server 1206, computer 1204, laptop 1202) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
    detecting, via circuitry and an antenna coupled with a contact pad of a transaction card, wireless communication signals comprising data; and
    providing, via the circuitry and the antenna, power to a display of the transaction card, wherein the power is induced on the circuitry and the antenna when the transaction card is present in a radio frequency field.

2. The method of claim 1, comprising updating, via the circuitry, the display on the transaction card to display information.

3. The method of claim 2, wherein the information comprises an identifying number for a transaction account.

4. The method of claim 2, wherein the information comprises at least one of account information for a transaction account associated with the transaction card or access credentials for an event.

5. The method of claim 1, wherein the display is at least one of an electrophoretic display or a memory liquid crystal display ("memory LCD").

6. The method of claim 1, wherein the wireless communication is a near field communication ("NFC") received from at least one of a mobile device or a payment terminal.

7. The method of claim 1, wherein the display is configured to automatically fade out over a predetermined period of time.

8. A transaction card comprising:
    a display;
    a contact pad;
    an antenna coupled with the display and the contact pad;
    an
    circuitry coupled with the antenna, the contact pad, and the display, the circuitry configured to:
    detect, via the circuitry and the antenna coupled with the contact pad, wireless communication signals comprising data; and
    provide, via the circuitry and the antenna, power to the display, wherein the power is induced on the circuitry and the antenna when the transaction card is present in a radio frequency field.

9. The transaction card of claim 8, wherein the circuitry configured to cause the display on the transaction card to display information.

10. The transaction card of claim 9, wherein the information comprises an identifying number for a transaction account.

11. The transaction card of claim 9, wherein the information comprises at least one of account information for a transaction account associated with the transaction card or access credentials for an event.

12. The transaction card of claim 8, wherein the display is at least one of an electrophoretic display or a memory liquid crystal display ("memory LCD").

13. The transaction card of claim 8, wherein the wireless communication is a near field communication ("NFC") received from at least one of a mobile device or a payment terminal.

14. The transaction card of claim 8, wherein the display is configured to automatically fade out over a predetermined period of time.

15. A non-transitory computer-readable storage medium, the computer-readable storage medium including instructions that when executed by a device, cause the device to:
    detect, via circuitry and an antenna coupled with a contact pad of a device, wireless communication signals; and
    provide, via the circuitry and the antenna, power to a display, wherein the power is induced on the circuitry and the antenna when the device is present in a radio frequency field.

16. The computer-readable storage medium of claim 15, wherein the device is configured to display information on the display.

17. The computer-readable storage medium of claim 16, wherein the information comprises an identifying number for a transaction account.

18. The computer-readable storage medium of claim 16, wherein the information comprises at least one of account information for a transaction account associated with a transaction card or access credentials for an event.

19. The computer-readable storage medium of claim 15, wherein the display is at least one of an electrophoretic display or a memory liquid crystal display ("memory LCD").

20. The computer-readable storage medium of claim 15, wherein the wireless communication is a near field communication ("NFC") received from at least one of a mobile device or a payment terminal.

* * * * *